Figure 1:
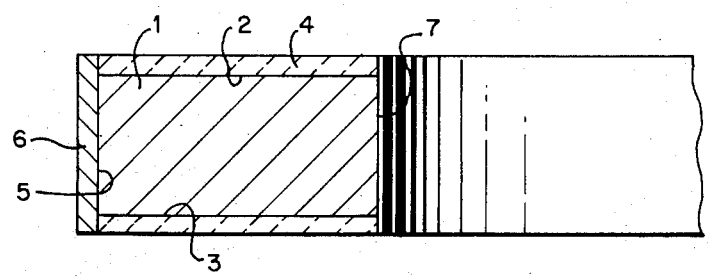

United States Patent [19]
Suzuki et al.

[11] 3,806,139
[45] Apr. 23, 1974

[54] PISTON RING

[75] Inventors: Shoji Suzuki; Eisuke Sugahara, both of Tokyo, Japan

[73] Assignee: Nippon Piston Ring Kabushiki Kaisha, Tokyo, Japan

[22] Filed: Mar. 30, 1972

[21] Appl. No.: 239,694

[52] U.S. Cl............................ 277/235 A, 204/38 A
[51] Int. Cl.......................... F16j 15/00, F16j 15/32
[58] Field of Search................... 277/235 A, DIG. 6; 204/38 A, 38 E

[56] References Cited
UNITED STATES PATENTS
3,583,713   6/1971   Sugahara ........................ 277/235 A
3,279,936   10/1966   Forestek............................ 204/38 E

*Primary Examiner*—Samuel B. Rothberg
*Attorney, Agent, or Firm*—Hans Berman

[57] ABSTRACT

A gapped aluminum alloy piston ring for an internal combustion engine whose outer axial face is chromium plated while the axially spaced radial faces are hard anodized. The chromium plate is durable under conditions of sliding friction in contact with the cylinder wall, while the anodized surfaces are even better than chromium plate in resisting wear under the axial impact of the walls in the piston grooves which retain the ring. The partly chromium plated and partly anodized rings can be manufactured in a simpler manner with fewer rejects than rings which are chromium plated all over.

7 Claims, 3 Drawing Figures

PISTON RING

This invention relates to light metal piston rings, and particularly to aluminum alloy rings having hard outer coatings on their outer surfaces exposed to wear by contact with respective walls of the cylinder or of the grooves in the piston which retain the rings.

In U.S. Pat. No. 3,583,713, one of us has disclosed a light metal piston ring whose core is coated with electrodeposited chromium over all its contact surfaces. While such a piston ring has been found very effective in reducing wear due to ring flutter because of its low weight, and of good resistance to frictional wear due to the chromium plate, it is relatively difficult to produce to the necessary close tolerances. The current density during electroplating tends to be much higher along the edges of the ring than elsewhere, and an annular bead of chromium forms along each outer edge unless the ring is mounted in a wire cage or "thief" which, during electrodeposition, is connected to the cathode and draws some of the electroplate away from the ring edge.

It has now been found that this problem can be avoided entirely, and an even better aluminum ring obtained by limiting the chromium electrodeposit to the axial faces of the ring, or to the outer axial face, and to provide the two radial faces with a layer of aluminum oxide by anodizing the corresponding faces of the aluminum core, the term "aluminum" being used loosely, as is common in this art, to embrace alloys whose predominant constituent is aluminum, and of which several examples have been given in the afore-mentioned patent. Pure aluminum is not a suitable material of construction for a piston ring because of its low mechanical strength.

It has been proposed heretofore to coat aluminum piston rings with an anodically formed oxide layer over all its surfaces, but it has been found that no anodized coating can rival the wear resistance of a chromium deposit on the outer axial ring face without sharply accelerating the wear of the cylinder face with which it is in sliding contact, whether the cylinder face be steel or an aluminum alloy. On the other hand, the radial ring faces, which engage the walls of the annular grooves in the piston in axial abutment at each reversal of direction of the piston movement, have been found to be more durably protected by a layer of anodically formed aluminum oxide integral with the metal of the core, and that such a layer does not accelerate the wear of the piston grooves for any conventionally employed piston material.

The thickness of the chromium facing which constitutes the outer axial face of the ring must not be smaller than 0.03 mm, and it is not economical to make it heavier than 0.3 mm since no significant further improvement is achieved by a heavier facing.

The aluminum oxide layer on each radial ring face should not be thinner than 0.02 mm, nor is it improved by a thickness greater than 0.2 mm. The anodized layer is porous, and may retain a solid lubricant such as graphite, polytetrafluoroethylene or nylon, a polyamide, in its pores.

The inner axial face of the ring normally does not need any protection, and the aluminum alloy of the core may be left exposed there. If so desired, the inner axial ring face may be electroplated with nickel or chromium for appearance as well as corrosion protection, or it may be anodized.

Figure 2:
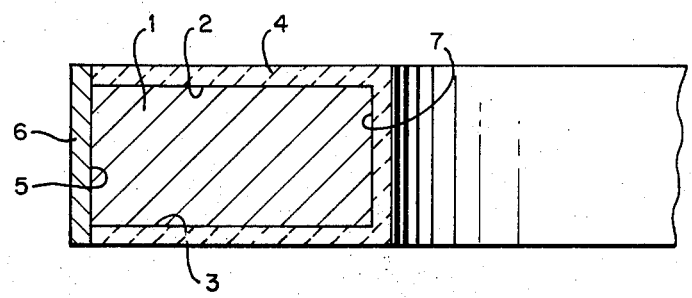
Figure 3:
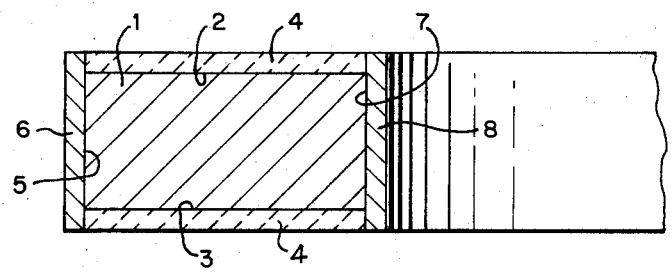

Other features, additional objects, and many of the attendant advantages of this invention will readily be appreciated as the invention becomes better understood by reference to the attached drawing in which:

FIG. 1 shows a first piston ring of the invention in fragmentary section on the ring axis; and FIGS. 2 and 3 illustrate additional embodiments of the invention in respective views corresponding to that of FIG. 1.

Common to the three illustrated piston rings is a core 1 of one of the aluminum alloys referred to above having axially spaced, flat, annular, radial faces 2, 3 and radially spaced, cylindrical, annular, axial faces 5, 7.

The inner axial face 7 of the aluminum alloy core 1 shown in FIG. 1 is bare. The outer axial face 5 carries a chromium layer 6 of the type described in the earlier patent, and the two radial faces 2, 3 are provided with hard layers 4 essentially consisting of aluminum oxide by anodizing, as will presently be described.

The rings shown in FIGS. 2 and 3 differ from that illustrated in FIG. 1 by protective coatings on the inner axial faces 7. The ring of FIG. 2 has an integral, inner oxide facing formed simultaneously with the layers on the radial faces 2, 3, and the inner axial face 7 of the ring partly shown in FIG. 3 is provided with an electrodeposit 8 of nickel and/or chromium, conventional in itself, and mainly of decorative value.

The initially bare piston ring cores 1 were treated as follows:

While each ring was held in an annular masking jig coated with polytetrafluoroethylene which covered the radial surfaces and slightly projected beyond their edges, the still exposed outer and inner axial surfaces were prepared for plating in the usual manner. chromium was deposited from a known aqueous bath containing 250 g/1 chromium trioxide and 2.5 g/1 sulfuric acid at a cathode current density of 40 to 60 amps./dm² and a temperature of 45° to 60° C, the temperature and current density being held constant during each run for proper control of deposit thickness. If the inner axial face was to be coated with nickel, the masking jig employed in chromium plating essentially consisted of two imperforate circular plates sealingly receiving the ring therebetween so that only the outer axial face was exposed. The afore-described annular jig was employed during subsequent nickel plating in a conventional bright nickel plating solution, the chromium-plated outer face being masked with stop-off lacquer.

For anodizing, each ring was received between two annular, coaxial masks which protected the previously applied electrodeposits on the two axial surfaces or the bare inner axial surface. Titanium was employed as the material of construction for at least one mask which simultaneously served as a conductive connector to the positive terminal of a rectifier while the radial surfaces of the ring were anodized in 15 percent (vol.) aqueous sulfuric acid at 2.2 to 2.7 amps./dm², the electrolyte being cooled to a temperature between 0° and 10° C for maximum hardness of the anodized coating. The resiliency of the ring itself, compressed between the two closely fitting masks, provided adequate contact pressure.

The anodized surfaces were impregnated by immersing the thoroughly rinsed rings in aqueous emulsions or suspensions of the impregnating agent chosen, and by alternatively applying atmospheric pressure and a vacuum of about 25 in. to 29 in. Hg. Subsequent rinsing with water removed externally adhering impregnating agent. The several procedures outlined above are conventional in themselves, and others may be substituted to suit specific operating conditions of the shop in which the piston rings are prepared.

It should be understood, therefore, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. In a gapped piston ring having an axis, two axially offset outer radial faces, and radially offset outer and inner axial faces, the improvement which comprises:
   a a core essentially consisting of an aluminum alloy;
   b a facing of hard chromium electroplate on said core and defining said outer axial face; and
   c respective layers of aluminum oxide defining said two radial faces, said aluminum oxide layers being integral with said core.

2. In a piston ring as set forth in claim 1, the thickness of each layer of aluminum oxide being at least 0.02 mm.

3. In a piston ring as set forth in claim 2, the thickness of each layer of aluminum oxide being not substantially greater than 0.2 mm, and the thickness of said facing being between 0.03 mm and 0.3 mm.

4. In a piston ring as set forth in claim 1, said layers being formed with pores, and retaining a solid lubricant in said pores.

5. In a piston ring as set forth in claim 4, said lubricant being polytetrafluoroethylene or a polyamide.

6. In a piston ring as set forth in claim 1, a layer of electrodeposited nickel or chromium on said core and defining said inner axial face.

7. In a piston ring as set forth in claim 1, a facing of aluminum oxide integral with said core and defining said inner axial face, the thickness of said aluminum oxide facing being at least 0.02 mm.

* * * * *

UNITED STATES PATENT OFFICE
CERTIFICATE OF CORRECTION

Patent No. 3,806,139            Dated April 23, 1974

Inventor(s) SHOJI SUZUKI ET AL

It is certified that error appears in the above-identified patent and that said Letters Patent are hereby corrected as shown below:

In the heading, after line /21/ insert --

/30/ Foreign Application Priority Data

October 5, 1971   Japan ............... 46-77515     --

Signed and sealed this 10th day of September 1974.

(SEAL)
Attest:

McCOY M. GIBSON, JR.                     C. MARSHALL DANN
Attesting Officer                          Commissioner of Patents